United States Patent
Williamson et al.

(10) Patent No.: US 12,180,562 B2
(45) Date of Patent: Dec. 31, 2024

(54) SYSTEM FOR SALT REMOVAL FROM URANIUM METAL

(71) Applicant: Energy, United States Department of, Washington, DC (US)

(72) Inventors: Mark A. Williamson, Naperville, IL (US); James L. Willit, Batavia, IL (US); Stanley G. Wiedmeyer, Glen Ellyn, IL (US); Terry R. Johnson, Wheaton, IL (US); Javier Figueroa, Andover, KS (US); Terry Alan Cruse, Lisle, IL (US)

(73) Assignee: U.S. Department of Energy, Washington, DC (US)

( * ) Notice: Subject to any disclaimer, the term of this patent is extended or adjusted under 35 U.S.C. 154(b) by 643 days.

(21) Appl. No.: 16/845,558

(22) Filed: Apr. 10, 2020

(65) Prior Publication Data

US 2021/0317548 A1   Oct. 14, 2021

(51) Int. Cl.
| | |
|---|---|
| *C22B 60/02* | (2006.01) |
| *B01D 1/00* | (2006.01) |
| *B01D 1/14* | (2006.01) |
| *B01D 5/00* | (2006.01) |
| *C22B 9/00* | (2006.01) |
| *C22B 9/02* | (2006.01) |
| *C22B 9/05* | (2006.01) |
| *F27B 14/00* | (2006.01) |
| *F27B 14/08* | (2006.01) |

(52) U.S. Cl.
CPC ........ *C22B 60/0213* (2013.01); *B01D 1/0011* (2013.01); *B01D 1/0082* (2013.01); *B01D 1/14* (2013.01); *B01D 5/006* (2013.01); *C22B 9/02* (2013.01); *C22B 60/0286* (2013.01); *C22B 9/006* (2013.01); *C22B 9/05* (2013.01); *F27B 2014/004* (2013.01); *F27B 2014/0875* (2013.01)

(58) Field of Classification Search
None
See application file for complete search history.

(56) References Cited

U.S. PATENT DOCUMENTS

| | | | | |
|---|---|---|---|---|
| 3,373,014 | A * | 3/1968 | Merles | ................ C22B 21/0061 75/388 |
| 3,826,718 | A * | 7/1974 | Takayasu | ................. B01D 3/10 202/185.1 |
| 2021/0317548 | A1 * | 10/2021 | Williamson | ......... B01D 1/0082 |

\* cited by examiner

*Primary Examiner* — Scott R Kastler
(74) *Attorney, Agent, or Firm* — Timothy L. Harney; Aaron R. Keith; Michael J. Dobbs

(57) ABSTRACT

According to one aspect of the invention, a system to separate salt from uranium. The system has a vessel, a heater, a pump, and a condenser. The vessel is adapted to receive a uranium that has a salt concentration. The heater heats the uranium for a period of time, causing the salt to turn into a salt vapor and the uranium to melt. The melted uranium releases the salt vapor. The pump circulates an inert gas that carries the salt vapor away from the melted uranium. The condenser is adapted to receive the salt vapor.

9 Claims, 3 Drawing Sheets

SYSTEM FOR SALT REMOVAL FROM URANIUM METAL

GOVERNMENT INTERESTS

The United States Government has rights in this invention pursuant to Contract No. DE-AC02-06CH11357 between the U.S. Department of Energy (DOE) and UChicago Argonne, LLC.

FIELD OF THE INVENTION

The present invention relates to a system for removing salt from uranium metal.

BACKGROUND OF THE INVENTION

For used nuclear fuel processing, salt must be removed from the recovered uranium prior to preparing the metal for post processing uses, sometimes storage and sometimes recycling into nuclear fuel. If the uranium was placed directly into storage without removal of salt, the salt would corrode the storage container and nuclear fuel in addition to other corrosion reactions such as those with the fuel cladding due to the hygroscopic nature of the salt. Without salt removal, the metal cannot be used directly in the fabrication of nuclear fuel, such as fast reactor fuel, because the salt contamination in the metal would result in the material exceeding fuel specifications for chloride content, which is typically less than 150 ppm. For safety, systems integrity, and chemical purity concerns, salt must be removed from the uranium regardless of whether the fuel will be recycled or stored. Thus, a safe and efficient physical separation process is needed to remove the salt from the uranium.

SUMMARY OF THE INVENTION

According to one aspect of the invention, a system to separate salt from uranium is provided. The system has a vessel, a heater, a pump, and a condenser. The vessel is adapted to receive a uranium that has a salt concentration. The heater heats the uranium for a period of time, causing the salt to turn into a salt vapor and the uranium to melt. The melted uranium releases the salt vapor. The pump circulates an inert gas that carries the salt vapor away from the melted uranium. The condenser is adapted to receive the salt vapor.

BRIEF DESCRIPTION OF THE DRAWINGS

Embodiments of the present invention are illustrated in the accompanying figures where.

DETAILED DESCRIPTION OF THE INVENTION

The following detailed description provides illustrations for embodiments of the present invention. Those skilled in the art will recognize that other embodiments for carrying out or practicing the present invention are also possible.

Figure 1:
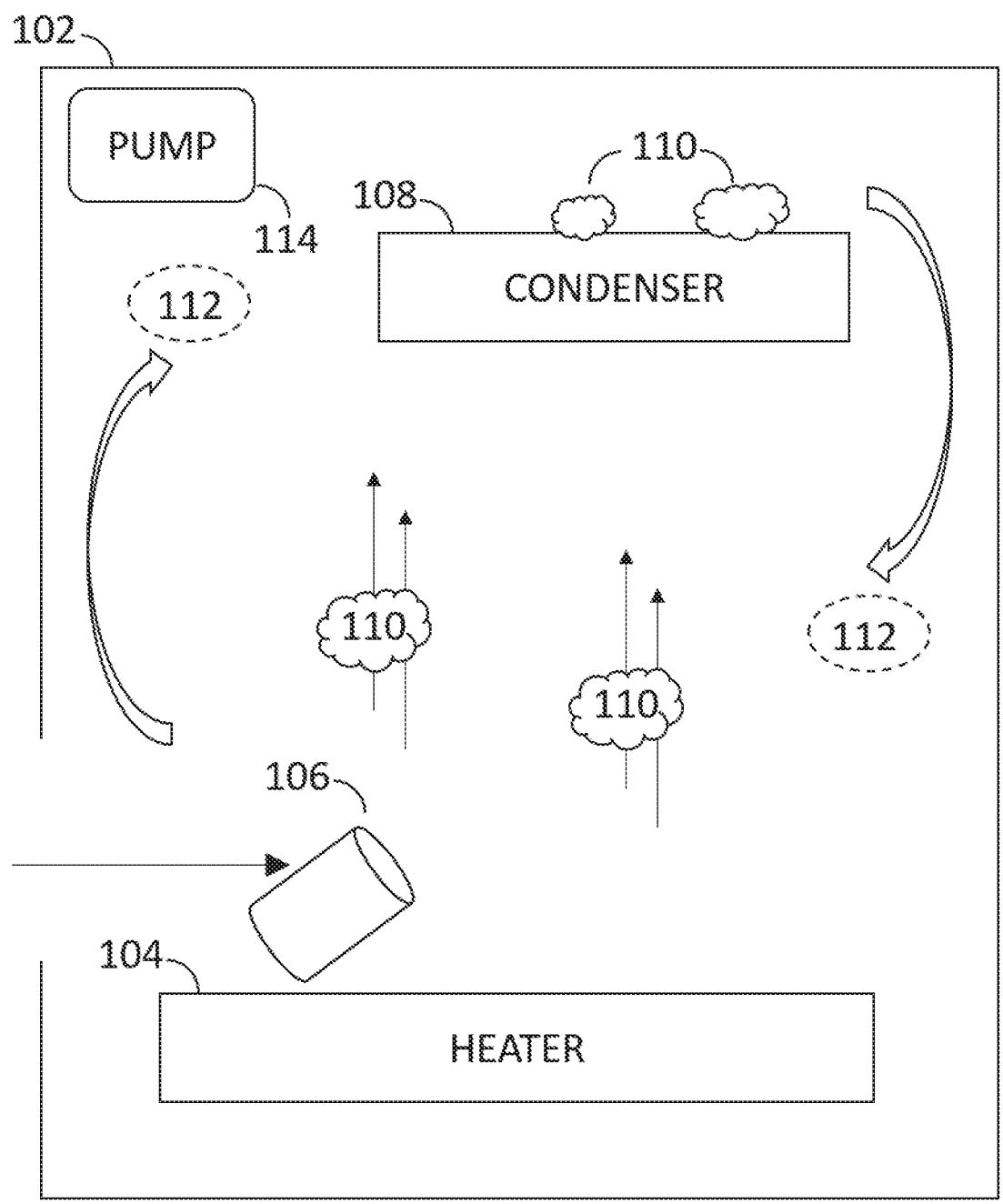
FIG. 1 is a schematic of a first embodiment of a system to separate salt from uranium.

Referring to FIG. 1, an embodiment of a system 100 to separate salt from uranium 106 is shown. The system 100 has a vessel 102, a heater 104, a pump 114, a condenser 108, and uranium 106 having a salt concentration. The heater 104, condenser 108, and uranium 106 are placed within the vessel 102. The heater 104 heats the uranium 106 until the salt vaporizes and forms a salt vapor 110. The salt vapor 110 is carried to a condenser 108 by an inert gas 112 that is circulated within the vessel 102 by a pump 114.

The system 100 can operate in batch modes, processing one batch of uranium 106 at a time. A batch can be one piece of uranium 106 or multiple pieces of uranium 106. Or, it can operate continuously with a continuous feed of uranium 106 being received into the system 100. The system 100 operates at a temperature approximately up to 1,500° C. The system 100 operates safely by design within criticality parameters, by geometry, no use of water as a coolant, and minimization of neutron moderating materials.

The vessel 102 is adapted to receive uranium 106 having a salt concentration. The amount of uranium 106 received by the vessel 102 is determined by the operational requirements of the system, e.g., whether it is operating in batch mode or continuously, and how much uranium 106 needs to be processed and is capable of being processed by the operational constraints, such as the size of the vessel 102, the operational time, the heating time, the capacity of the condenser, etc. The uranium 106 can be received by a manual delivery of the uranium 106 within the vessel 102. The uranium 106 can be received by a conveyor. In any embodiment, the uranium 106 is received by the vessel 102. The vessel 102 is made from materials capable of withstanding the high temperature heater 104, up to approximately 1,500° C. For example, the vessel 102 can be made from 300 Series stainless steel or other pure metals or alloys compatible with liquid uranium. In an embodiment, the vessel 102 receives the uranium 106 within a crucible in the vessel 102. The crucible is compatible with liquid uranium. The vessel is isolated from the crucible.

The system 100 accepts uranium 106 into the vessel 102. The uranium 106 has a salt concentration. The uranium 106 can contain a salt concentration of approximately 10-35 weight percent of the uranium 106. The uranium 106 can be in any form that is capable of being placed in the vessel 102 and heated. For example, the uranium 106 can be a dendrite or it can be an ingot. The uranium 106 can be any size, so long as the uranium 106 is capable of being accepted into the vessel 102 and being processed by the system 100 to separate the salt concentration within the uranium 106. The form of the uranium 106 will depend on what prior processes, if any, were done to the uranium 106 prior to arriving at the system 100. The salt can be adhered to the surface of the uranium 106 or can be occluded within the uranium 106. The salt can be an electrolyte salt. In an embodiment, the uranium 106 is a uranium cathode product recovered from an electrorefiner with salt adhering to the metal and occluded within.

Prior to being received by the vessel 102, the uranium 106 can be prepared for processing, for example, by shredding the uranium 106. In modeling of the present system 100, 375 kg of uranium 106 in the form of metallic dendrites and about 145 kg of salt were fed into the vessel 102. In this model, the approximate composition of the salt was 75 weight percent LiCl, 6% actinide chlorides, and 19% fission product chlorides.

Due to safety, systems integrity, and criticality concerns, this salt must be removed from the uranium 106 prior to either storage or recycling of the fuel. Regardless of whether the uranium 106 will be cast into an ingot for storage or using it in the fabrication of fast reactor fuel, the hygroscopic nature of the salt could also lead to other corrosion reactions if it is not removed from the uranium 106. If the uranium 106 were placed directly into storage, the salt would corrode the storage container and metal. If the uranium 106 were used directly in the fabrication of fast reactor fuel, the presence of a salt concentration would cause noncompliance with fuel specifications for chloride content, which is typically less than 150 ppm. The system 100 removes at least substantially all salt from the uranium 106 through vaporization. For the purposes of this application, substantially all means at least approximately 90% of the salt concentration is removed from the uranium 106 through vaporization. Preferably, more than 90% of the salt concentration is removed from the uranium, and the system 100 should be optimized for such operation.

The heater 104 heats the uranium 106 for a period of time, causing the salt to turn into a salt vapor 110. The heated uranium 106 releases the salt vapor 110. The heater 104 is designed to operate in an inert atmosphere, for example an argon atmosphere. When the vessel 102 receives the uranium 106, the uranium 106 is placed in proximity to the heater 104. For the present invention, proximity is defined as close enough to accomplish the intended purpose. In this instance, the uranium 106 may be touching, but need not be, the heater, or it may be placed close enough to the heater 104, and not touching the heater 104, to be heated enough to vaporize the salt concentration of the uranium 106. The heater 104 vaporizes the salt concentration of the uranium 106, removing the salt via vaporization. Once the uranium 106 is inside the vessel 102, the uranium 106 is steadily heated by the heater 104 until the uranium 106 is melted. The heater 104 heats the uranium 106 until the uranium 106 is melted, approximately 1200° C. (±40° C.). As the materials come to temperature, the salt concentration vaporizes from the uranium 106. Heating the uranium 106 to approximately 1200° C. provides a higher vaporization rate and ensures that the uranium 106 is molten. In an embodiment, the uranium 106 is heated over the course of approximately 24 hours to separate the salt concentration from the uranium 106. In any embodiment, the uranium 106 is heated for enough time to vaporize the concentration of salt in the uranium 106.

The heater 104 can be an induction furnace. In an embodiment, the induction furnace is powered by a commercial, high-frequency (~10 to 30 kHz), 40 kW induction power supply. The heater 104 can have heating coils fabricated from grade C14300, C15150, or C15500 nickel plated copper alloy which has a softening temperature above 500° C. The coil temperature is predicted to be approximately 200° C.

Salt removal from uranium 106 is accomplished through vaporization. Because the uranium 106 has a higher melting point than the salt, the uranium 106 and salt concentration separate due to the large density difference between the salt and uranium 106 (approximately 1.75 g/cm3 vs. 18 g/cm3, respectively). Vaporization is an effective means to remove the salt concentration from the uranium 106 because the vapor pressure of the salt concentration is significantly greater than that of uranium metal at 1200° C. The vapor pressure of the salt concentration can range between approximately $9.4 \times 10^{-3}$ atm at 1200° C. and 0.40 atm at 1200° C. In comparison, the vapor pressure of the heated uranium at 1200° C. is calculated to be $2.0 \times 10^{-12}$ atm. The vapor pressures of the salt concentration remain higher than that of the heated uranium 106. Because the inciting point of uranium 106 is 1132° C., removal of residual salt, including salt occluded within the uranium 106, is facilitated by melting the uranium 106 and allowing the salt to vaporize from the surface of the melted uranium.

The salt concentration is vaporized by transpiration rather than vacuum distillation to overcome the throughput required of the system 100 as well as eliminate system safety hazards. Remotely making reoccurring vacuum-tight seals, maintaining elastomers in high radiation fields, and low production rate make vacuum distillation unattractive for this application In alternate embodiments, the melted uranium can be drawn from the bottom of the vessel 102 into a receiving mold where it will solidify to form a uranium ingot. A uranium ingot produced by the present system could weigh approximately 2,280 kg. From there, the got can be removed to a storage vessel for later disposition or be sent through a waste treatment. If the uranium ingots are sent for storage, they would be packaged and moved to a storage warehouse. In some embodiments, at least part of the uranium can be transferred to and chlorinated in a drawdown vessel for use in pyroprocessing used nuclear fuel.

The condenser 108 is adapted to receive the salt vapor 110. A pump 114 circulates the salt vapor 110 within the vessel. The pump 114 circulates an inert gas 112 that carries the salt vapor 110 to the condenser 108. At the condenser 108, the salt vapor 110 is collected and condensed to a liquid.

The pump 114 can be located within the vessel 102 or outside of the vessel 102. The pump 114 circulates an inert gas 112 that carries the salt vapor 110 away from the melted uranium 106. The inert gas 112 must have a higher purity than the vessel 102 atmosphere to minimize actinide losses by reaction with water vapor. The vessel 102 atmosphere may contain up to 100 ppm of water. To keep plutonium and other actinide losses below 1%, their chlorides must be distilled while the inert gas 112 has 5 ppm water or less.

In alternate embodiments, the salt vapor 110 can be directed from the condenser 108 into a salt holding tank. The salt holding tank can be located outside the vessel 102 to collect the salt for reuse.

In some embodiments, level and density probes in the system 100 are used to provide real-time measurements of salt volume and density. These measurements are used as a method of tracking trends to flag potential mass balance discrepancies as well as absolute measurements to track the amount of fissile-containing salt in each process vessel. Process knowledge and experience over time is used to characterize the normal trends in liquid levels during the process. For example a gradual decrease in the salt in the system 100 due to salt drag out with the uranium and transuranic products should coincide with an increase in salt level in the salt collection tank. Deviations from the normal trends would indicate off-normal addition or removal of process salt. Impurity build-up in the operations is monitored and controlled, through the salt recycle process, to the levels required to meet fuel and waste specifications.

Figure 2:
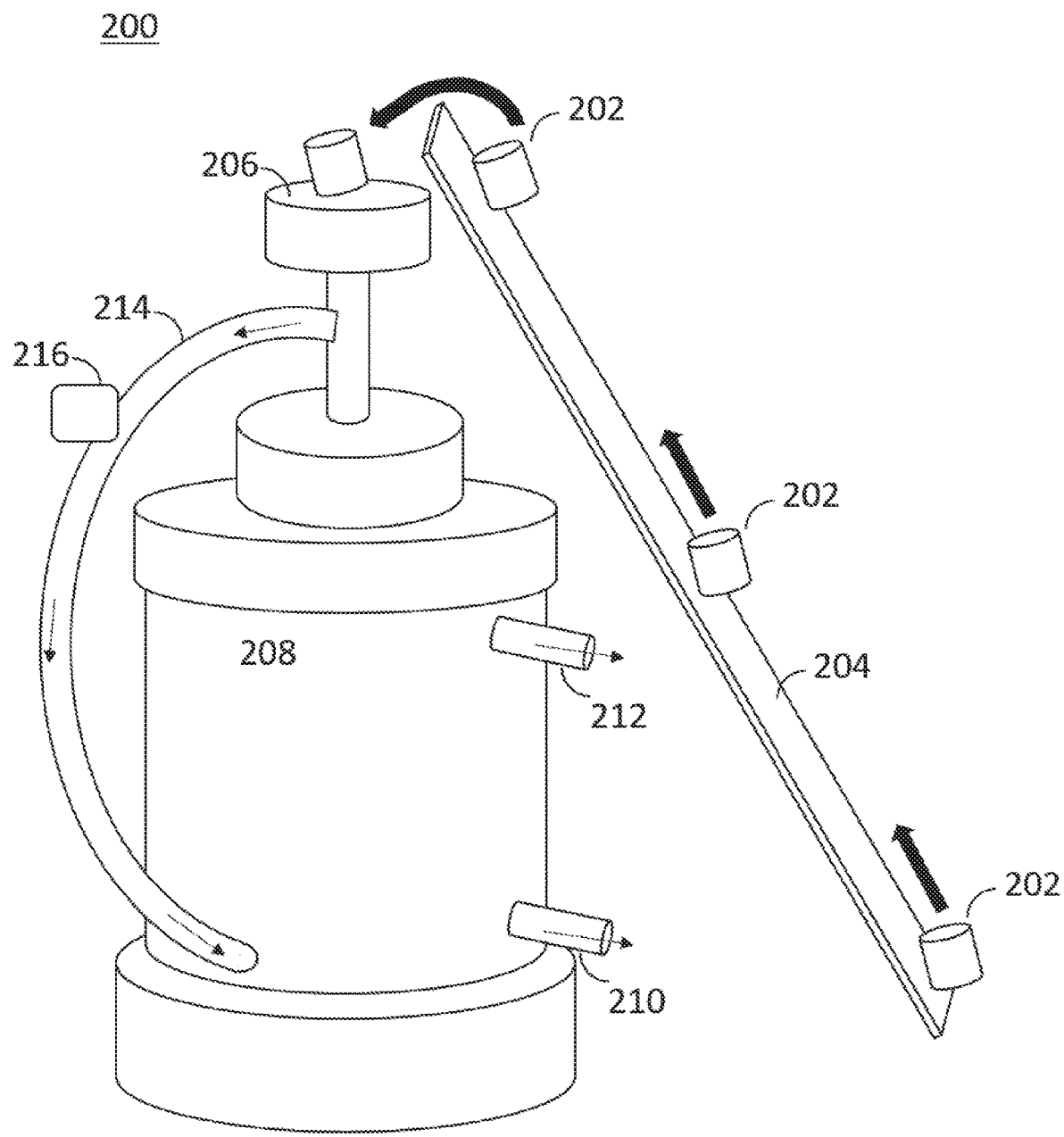
FIG. 2 is a schematic of a second embodiment of a system to separate salt from uranium.

Referring to FIG. 2, an embodiment of a system 200 to separate salt from uranium 202 is shown. The system 200 has a moving track 204, an intake shredder 206, a vessel 208, a pump 216, a salt product outlet 212, and a uranium product outlet 210. The system 200 has uranium 202 with a salt concentration placed on a moving track 204 that carries the uranium 202 to the intake shredder 206.

The system 200 can operate in batch modes, processing one batch of uranium 202 at a time. Or, it can operate continuously with a continuous feed of uranium 202 being received into the system 200 and a continuous feed of products removed from the system 200. The system 200 operates at a temperature approximately to 1,500° C. The system 200 operates safely by design within criticality parameters, by geometry, no use of water as a coolant, and minimization of neutron moderating materials.

The uranium 202 has a salt concentration. The uranium 202 can contain approximately 28 weight percent salt. The uranium 202 can be in any form that is capable of being placed in the intake shredder 206. For example, the uranium 202 can be a dendrite or it can be an ingot. The form of the uranium 202 will depend on what prior processes, if any, were done to the uranium 202 prior to arriving at the system 200. The salt can be adhered to the surface of the uranium 202 or can be occluded within the uranium 202. The salt can be an electrolyte salt. In an embodiment, the uranium 202 is a uranium cathode product recovered from an electrorefiner with salt adhering to the metal.

The moving track 204, in any embodiment, is capable of moving the uranium 202 into the product intake shredder 206. For example, the moving track 204 can be a conveyor belt that uses metal flights to carry the uranium 202 having a salt concentration up to the product intake shredder 206. In an embodiment, the system 200 also has a catch pan below the moving track 204 to collect any uranium 202 falling from the moving track 204.

The uranium 202 is carried up a moving track 204 to the uranium intake shredder 206 at the top of the system 200. From the end of the moving track 204, the uranium 202 is received by the intake shredder 206. The uranium 202 can fall into the intake shredder 206 or it can be mechanically moved into the intake shredder 206.

The vessel 208 is adapted to receive the uranium 202 from the intake shredder 206. The uranium 202 can be received into the vessel 208 by any means, for example gravitational mechanisms or an internal conveyor. The vessel 208 is made from materials capable of withstanding the high temperature heater, up to approximately up to 1,500° C. Within the vessel 208, a pump 216 circulates an inert gas through the vessel 208 and channel 214, as explained below in connection with FIG. 3.

Figure 3:
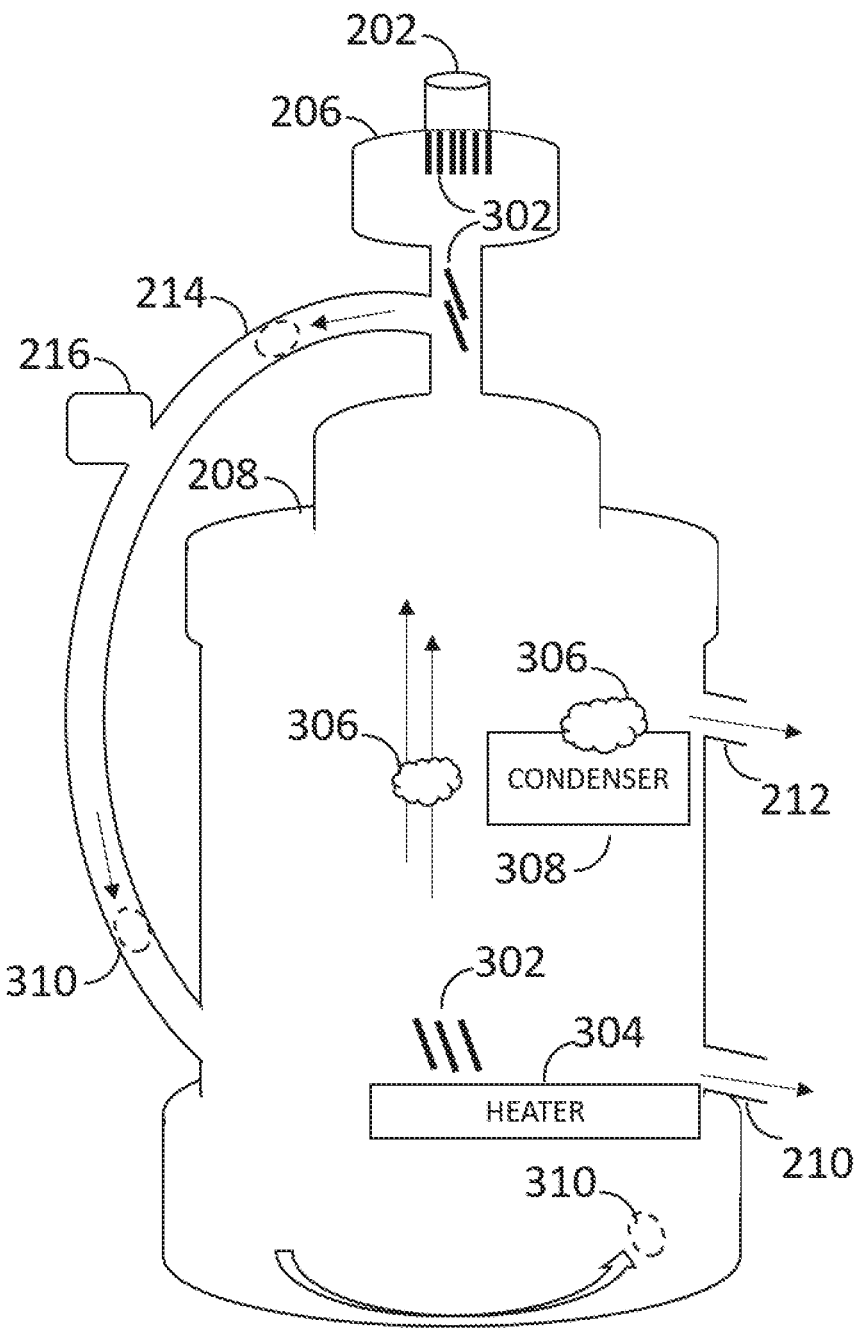
FIG. 3 is an isometric view of the inside of the vessel shown in FIG. 2.

Referring to FIG. 3, the inside of vessel 208 of FIG. 2 is shown. The uranium 202 is processed through the uranium intake shredder 206, creating uranium pieces 302. The shredder 206 is any device capable of reducing the size of the uranium 202 into pieces 302 that are able to move into the vessel 208. For example, the shredder 206 can have two counter-rotating shafts with tungsten carbide teeth to reduce the size of uranium 202 and direct them into the vessel 208. Uranium pieces 302 are received by vessel 208. Within the vessel 208, the uranium pieces 302 are heated by the heater 304.

The heater 304 heats the uranium pieces 302 for a period of time, causing the salt concentration within the uranium pieces 302 to turn into a salt vapor 306. The heated uranium pieces 304 release the salt vapor 306. The heater 304 is designed to operate in an inert atmosphere, for example an argon atmosphere. When the vessel 208 receives the uranium pieces 302, the uranium pieces 302 are placed in proximity to the heater 304. The heater 304 vaporizes the salt concentration of the uranium 302, removing substantially all the salt concentration via vaporization. The heater 304 heats the uranium pieces 302 until it is melted, approximately 1200° C. (±40° C.). As the materials come to temperature, the salt concentration vaporizes from the uranium pieces 302. Heating the uranium pieces 302 to approximately 1200° C. provides a higher vaporization rate and ensures that the uranium pieces 302 are molten. In an embodiment, the uranium pieces 302 are heated over the course of 24 hours to separate the salt concentration from the uranium pieces 302.

The heater 304 can be an induction furnace. In an embodiment, the induction furnace is powered by a commercial, high-frequency (~10 to 30 kHz), 40 kW induction power supply. The heater 304 can have heating coils fabricated from grade C14300, C15150, or C15500 nickel plated copper alloy which has a softening temperature above 500° C. The coil temperature is predicted to be approximately 200° C. In an embodiment, the heater 304 is separated from the condenser 308 by a heat shield; for example, the heater 304 is separated from the condenser 308 by a molybdenum alloy heat shield.

Salt removal from uranium pieces 302 is accomplished through vaporization. Because the uranium pieces 302 have a higher inciting point, the uranium 302 and salt concentration separate due to the large density difference between the salt and uranium 302 (approximately 1.75 g/cm3 vs. 18 g/cm3, respectively). Vaporization is an effective means to remove the salt concentration from the uranium pieces 302 because the vapor pressure of the salt concentration is significantly greater than that of uranium metal at 1200° C. The vapor pressure of the salt concentration can range between approximately $9.4 \times 10^{-3}$ atm at 1200° C. and 0.40 atm at 1200° C. In comparison, the vapor pressure of the heated uranium pieces 302 at 1200° C. is calculated to be $2.0 \times 10^{-12}$ atm. The vapor pressures of the salt concentration remain higher than that of the heated uranium pieces 302. Because the melting point of uranium pieces 302 is 1132° C., removal of residual salt, including salt occluded within the uranium 302, is facilitated by melting the uranium pieces 302 and allowing the salt to vaporize from the surface of the melted uranium.

The salt concentration is vaporized by transpiration rather than vacuum distillation to overcome the radiological and safety hazards required of the system 200. Remotely making reoccurring vacuum-tight seals, maintaining elastomers in high radiation fields, and low production rate make vacuum distillation unattractive for this application.

The melted uranium pieces 302 can be drawn from the bottom of the vessel 208 through outlet 210. From there the incited uranium 302 can be placed into a receiving mold where it will solidify to form a uranium ingot. A uranium ingot produced by the present system could weigh approximately 2,280 kg. From there, the uranium ingot can be removed to a storage vessel for later disposition or be sent through a waste treatment. If the uranium ingots are sent for storage, they would be packaged and moved to a storage warehouse. In some embodiments, at least part of the uranium can be transferred to and chlorinated in a drawdown vessel.

The condenser 308 is adapted to receive the salt vapor 306. A pump 216, located outside of the vessel 208 and inside a channel 214, circulates the salt vapor 306 within the vessel 208. The channel 214 provides a path for the inert gas 310 to circulate. The pump 216 circulates an inert gas 310 through the vessel 208 and channel 214. The inert gas 310 carries the salt vapor 306 to the condenser 308. At the condenser 308, the salt vapor 306 is collected. The salt vapor 306 is directed from the condenser 308 into a salt holding tank through outlet 212 to collect the salt for reuse.

The pump 216 is located within the channel 214. The pump 216 circulates an inert gas 310 that carries the salt vapor 306 away from the melted uranium pieces 302. The inert gas 310 must have a higher purity than the vessel 208 atmosphere to minimize actinide losses by reaction with water vapor. The vessel 208 atmosphere contains up to 100 ppm of water. To keep plutonium and other actinide losses below 1%, their chlorides must be distilled while the inert gas 112 has 5 ppm water or less. In an embodiment, within channel 214 is a filter to capture any remaining salt vapor 306 that is not collected at the condenser 308 but instead is carried by the inert gas 310 and circulated through the vessel 208.

In some embodiments, level and density probes in the system 200 are used to provide real-time measurements of salt volume and density. These measurements are used as a method of tracking trends to flag potential mass balance discrepancies as well as absolute measurements to track the amount of fissile-containing salt in each process vessel. Process knowledge and experience over time is used to characterize the normal trends in liquid levels during the process. For example a gradual decrease in the salt in the system 200 due to salt drag out with the uranium and transuranic products should coincide with an increase in salt level in the salt collection tank. Deviations from the normal trends would indicate off-normal addition or removal of process salt. Impurity build-up in the operations is monitored and controlled, through the salt recycle process, to the levels required to meet fuel and waste specifications.

At the condenser 308, the salt vapor 306 is collected and condensed. Once the salt vapor 306 is collected, it is removed from the vessel 208 through outlet 212.

It is to be understood that, the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. A system to separate salt from uranium, the system comprising:
   (a) a vessel adapted to receive uranium, the uranium having a salt concentration;
   (b) a heater placed within the vessel, the heater adapted to heat uranium to approximately 1200° C., the heater heating the uranium to about 1200° C. for a period of time causing the salt to turn into a salt vapor, the heated uranium releasing the salt vapor;
   (c) a pump in fluid communication with an interior of the vessel, the pump configured to circulate an inert gas within at least the interior whereby the inert gas carries the salt vapor away from the melted uranium;
   (d) a condenser placed within the vessel and in fluid communication with at least the heater and adapted to receive the salt vapor; and
   (e) a molybdenum alloy heat shield located between the condenser and the heated uranium.

2. The system of claim 1 wherein the vessel is made from stainless steel or other pure metals or alloys compatible with liquid uranium.

3. The system of claim 1 additionally including a shredder, the shredder adapted to shred the uranium prior to heating.

4. The system of claim 1 wherein the pump is external to the vessel.

5. The system of claim 1 wherein the pump comprises a compressor and a heat exchanger.

6. The system of claim 1 additionally comprising a least one measurement probe.

7. The system of claim 6 wherein the measurement probe is a level probe.

8. The system of claim 6 wherein the measurement probe is a density probe.

9. The system of claim 1 wherein the uranium is received within a crucible within the vessel, the crucible is adapted to be compatible with liquid uranium.

\* \* \* \* \*